(12) United States Patent
Stacey

(10) Patent No.: US 11,766,042 B1
(45) Date of Patent: Sep. 26, 2023

(54) ORGANIC CONTACT HERBICIDE AND METHOD OF USE THEREOF

(71) Applicant: MonarchChem, LLC, Summerdale, AL (US)

(72) Inventor: Lon E. Stacey, Gulf Shores, AL (US)

(*) Notice: Subject to any disclaimer, the term of this patent is extended or adjusted under 35 U.S.C. 154(b) by 30 days.

(21) Appl. No.: 17/687,600

(22) Filed: Mar. 4, 2022

Related U.S. Application Data

(60) Provisional application No. 63/156,691, filed on Mar. 4, 2021.

(51) Int. Cl.
*A01N 41/02* (2006.01)
*A01N 59/08* (2006.01)
*A01N 37/36* (2006.01)
*A01N 25/22* (2006.01)

(52) U.S. Cl.
CPC .............. *A01N 41/02* (2013.01); *A01N 25/22* (2013.01); *A01N 37/36* (2013.01); *A01N 59/08* (2013.01)

(58) Field of Classification Search
None
See application file for complete search history.

(56) References Cited

U.S. PATENT DOCUMENTS

| | | |
|---|---|---|
| 6,218,336 B1 | 4/2001 | Coleman |
| 6,509,297 B1 | 1/2003 | Coleman |
| 6,548,085 B1 | 4/2003 | Zobitne et al. |
| 6,812,190 B2 | 11/2004 | Coleman |
| 6,969,696 B2 | 11/2005 | Coleman |
| 8,043,636 B2 | 10/2011 | Wiese |
| 8,153,561 B2 | 4/2012 | Messerschmidt et al. |
| 8,188,004 B2 | 5/2012 | Hsu |
| 8,273,687 B2 | 9/2012 | Messerschmidt et al. |
| 8,404,260 B2 | 3/2013 | Reid et al. |
| 9,028,856 B2 | 5/2015 | Reid et al. |
| 2009/0099022 A1 | 4/2009 | Fernandez et al. |
| 2012/0309830 A1 | 12/2012 | Man et al. |
| 2017/0079278 A1 | 3/2017 | Quintero |
| 2017/0165203 A1 | 6/2017 | Dodd et al. |
| 2018/0168149 A1 | 6/2018 | Jones, Jr. |

FOREIGN PATENT DOCUMENTS

| | | | |
|---|---|---|---|
| CA | 2720372 C | 10/2009 | |
| CA | 2694448 A1 | 7/2010 | |
| CA | 2732386 A1 | 6/2011 | |
| CA | 3002472 A1 | 10/2019 | |
| CN | 101913942 A | * 12/2010 | |
| CN | 107034038 A | * 8/2017 | ............. C11D 1/146 |
| WO | 2012109639 A1 | 8/2012 | |
| WO | 2019238948 | 12/2019 | |

OTHER PUBLICATIONS

"Sodium Lauryl Sulfate Profile: Active Ingredient Eligible for Minimum Risk Pesticide Use," by Brian P. Baker and Jennifer A. Grant, New York State Integrated Pest Management, Cornell University, Geneva NY, published 2018.

Product label for weed killer sold under the trademarked name "Weed Rot" by Sierra Natural Science, Inc. based in Salinas, California.

\* cited by examiner

*Primary Examiner* — Alton N Pryor
(74) *Attorney, Agent, or Firm* — ADAMSIP, LLC; James Adams; Stephen Thompson

(57) ABSTRACT

An organic contact herbicide and a method of using the herbicide to eliminate weeds and grass are provided. The herbicide includes organic ingredients that are non-toxic and environmentally friendly. The herbicide may contain sodium lauryl sulfate, citric acid, malic acid, sodium chloride, an antifoaming agent, and water. The herbicide may be applied directly to foliage to control the growth of weeds, grass, or any other unwanted plants.

20 Claims, 2 Drawing Sheets

ORGANIC CONTACT HERBICIDE AND METHOD OF USE THEREOF

CROSS REFERENCES

This application claims the benefit of U.S. Provisional Application No. 63/156,691, filed on Mar. 4, 2021, which application is incorporated herein in its entirety by reference.

FIELD OF THE DISCLOSURE

The subject matter of the present disclosure refers generally to an organic contact herbicide and a method of using the herbicide to eliminate weeds and grass.

BACKGROUND

Herbicides encompass a wide variety of plant-killing compositions used to control the growth of unwanted plants, such as weeds and grass. Selective herbicides are utilized to control the growth of particular weed species while leaving other plant species, such as harvestable crops, unharmed, or at least relatively unharmed. Non-selective herbicides are utilized to kill all plant species to which the herbicide is applied. Thus, non-selective herbicides may be generally used in applications in which it is desired to clear all plant growth from a certain area. However, there are numerous disadvantages to many known herbicide compositions. For instance, many herbicides are toxic not only to plants but also to humans and wildlife, including mammals, fish, birds, insects, and many other animals. Other herbicides may contain carcinogenic compounds. In addition, many herbicides may persist in soil after application to weeds or cause groundwater contamination. Due to these concerns relating to the effects of herbicides on human health, wildlife, and the environment, many herbicides have been legally banned or heavily regulated to mitigate potential damage caused by their use. For instance, glyphosate is a common herbicide that has been prohibited on schools and playgrounds by many municipalities and states due to its toxicity. Furthermore, many commercially available herbicides contain not only the active herbicide compounds that may have high toxicity levels, but also additional inactive ingredients that may cause negative impacts on human health and the environment.

To overcome the adverse effects of many commonly used herbicides, attempts have been made to produce herbicides that are effective in eliminating unwanted plants but that do not contain compounds having a high level of toxicity. Herbicides referred to as "organic herbicides" encompass a large group of herbicides containing low toxicity chemical compounds that are generally naturally occurring, some of which may include homemade herbicides made from common household items. Organic herbicides may be contrasted with non-organic herbicides, which are generally synthetically produced herbicides that contain chemicals having significantly higher levels of toxicity than those used in organic herbicides. However, although organic herbicides generally have fewer adverse effects on human health and the environment, organic herbicides are also generally not as effective as synthetic herbicides. The effectiveness of organic herbicides is dependent on a variety of factors, such as the type of weed and the size of the weed to which the herbicide is applied. Organic herbicides are typically more effective on relatively small weeds. Because organic herbicides are typically contact herbicides, they generally require nearly complete coverage of the foliage to provide maximum effectiveness. However, organic herbicides typically break down quickly and thus often need to be reapplied frequently. In addition, the foliage of plants treated with organic herbicides may die, but the plant may re-sprout from the roots. Due to these characteristics, organic herbicides typically need to be used in conjunction with mechanical weed control practices.

Both organic and synthetic herbicides are regulated in the United States by the Environmental Protection Agency (EPA) and subject to the Federal Insecticide, Fungicide, and Rodenticide Act (FIFRA). Commercially sold herbicides, whether organic or synthetic, must be tested and approved by the EPA for sale and labeling. However, Section 25(b) of FIFRA lists both active and inert ingredients that are exempted from FIFRA regulation. Thus, compounds listed in Section 25(b) may generally be used in organic herbicides without approval from the EPA. However, to provide an adequate level of effectiveness, some herbicides that are generally considered to be "organic" may contain some ingredients that are not listed under Section 25(b), which means that such herbicides still need EPA approval, even if they have relatively low toxicity.

SUMMARY

In one aspect, an organic herbicide and a method of using the organic herbicide to control the growth of unwanted plants are provided. In a preferred embodiment, the organic herbicide comprises sodium lauryl sulfate, citric acid, malic acid, sodium chloride, water, and an antifoaming agent, which is preferably castor oil. The organic herbicide preferably comprises 2% to 15% sodium lauryl sulfate by weight, 2% to 15% citric acid by weight, 2% to 15% malic acid by weight, 2% to 15% sodium chloride by weight, 0.3% to 5% castor oil by weight, and at least 50% water by weight. More preferably, the organic herbicide may comprise 3% to 10% sodium lauryl sulfate by weight, 3% to 8% citric acid by weight, 3% to 8% malic acid by weight, 3% to 8% sodium chloride by weight, 0.3% to 1% castor oil by weight, and at least 65% water by weight. In one preferred embodiment, the organic herbicide comprises 7.5% sodium lauryl sulfate by weight, 6% citric acid by weight, 6% malic acid by weight, 5.5% sodium chloride by weight, 0.5% castor oil by weight, and 74.5% water by weight. In a preferred embodiment, all of the ingredients included in the herbicide are ingredients that are exempted under Section 25(b) of FIFRA, in which case the herbicide would not require EPA approval for use. In one preferred embodiment, the organic herbicide may consist essentially of sodium lauryl sulfate, citric acid, malic acid, sodium chloride, castor oil, and water and thus not include a substantial quantity of any other ingredients. In particular, the herbicide preferably does not include non-organic, synthetic ingredients, and more particularly does not include any ingredients not exempted under Section 25(b) of FIFRA. In alternative embodiments, the organic herbicide may include other ingredients and are considered to be non-toxic or environmentally friendly.

The present organic herbicide is a liquid formulation that may be used to eliminate weeds or any other unwanted plants. The herbicide is a contact herbicide. The individual ingredients may be adequately mixed into a homogenous liquid and then applied directly onto the foliage of weeds to be killed. The liquid herbicide may then be allowed to remain on the foliage of the weeds for a period of time sufficient to kill the weeds. The herbicide is non-selective and thus may harm or kill any plant onto which the herbicide is directly applied to the plant's foliage. However, the herbicide does not cause any soil contamination and thus kills only plants to which it is directly applied. After direct application of the herbicide onto foliage, initial effects of the herbicide may be visibly observed typically within hours of application.

The present organic herbicide includes a combination of ingredients that are believed to act synergistically and that may provide a complete kill of any weed or plant onto which the herbicide is directly applied. Although initial effects typically can be visibly observed within a relatively short period of time, the present organic herbicide may also provide a staggered, time-released kill of weeds that results in a prolonged and complete kill. In addition, the combination of ingredients may kill weeds systemically, which may significantly delay reemergence of weeds, thus making the present herbicide more effective than is typical of other known organic or environmentally friendly herbicides. To provide systematic killing of weeds, the present herbicide may move within the vascular system of a weed and thus kill the weed at its roots after initial application to the foliage of the weed. The present organic herbicide may be used in a variety of applications, such as agricultural application, forestry, residential lawn and garden applications, as well as at schools, parks, highways, railroads, or other commercial applications in which non-selective weed clearing is required.

The foregoing summary has outlined some features of the system and method of the present disclosure so that those skilled in the pertinent art may better understand the detailed description that follows. Additional features that form the subject of the claims will be described hereinafter. Those skilled in the pertinent art should appreciate that they can readily utilize these features for designing or modifying other structures for carrying out the same purpose of the system and method disclosed herein. Those skilled in the pertinent art should also realize that such equivalent designs or modifications do not depart from the scope of the system and method of the present disclosure.

DESCRIPTION OF THE DRAWINGS

These and other features, aspects, and advantages of the present disclosure will become better understood with regard to the following description, appended claims, and accompanying drawings where:

DETAILED DESCRIPTION

Figure 1:
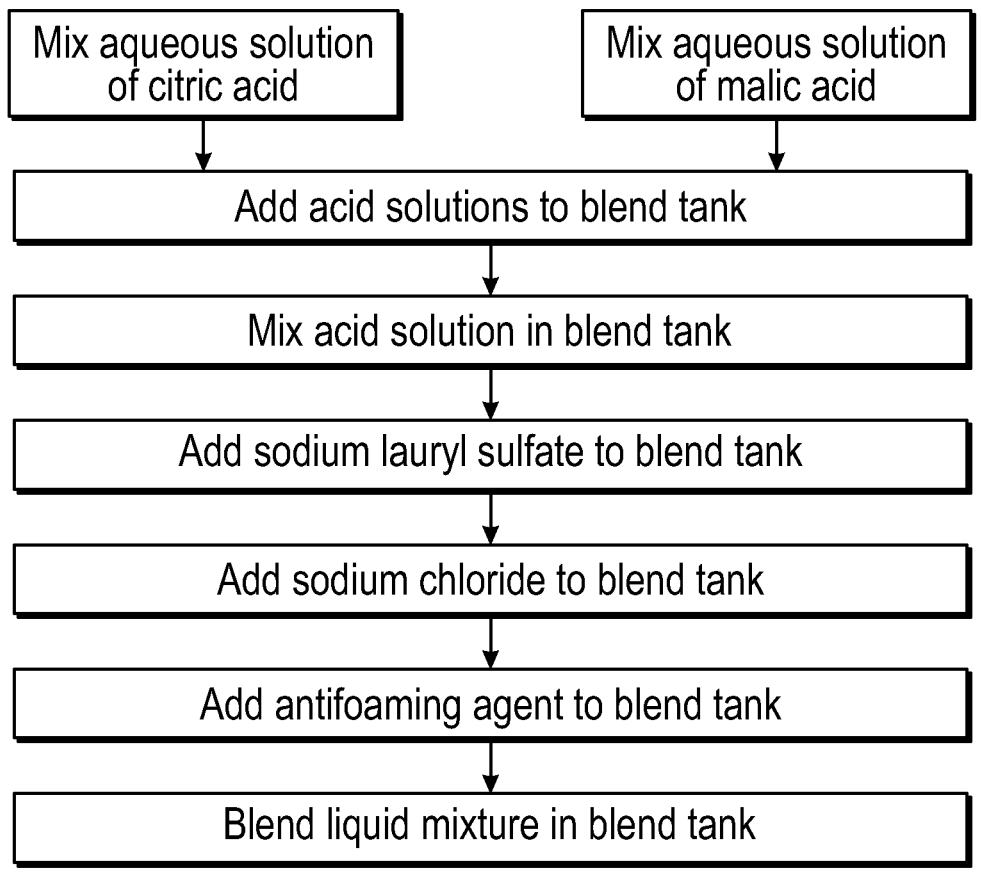
FIG. 1 shows a process flow diagram of an illustrative method for producing a liquid organic contact herbicide in accordance with the present disclosure.

In the Summary above and in this Detailed Description, and the claims below, and in the accompanying drawings, reference is made to particular features, including method steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, steps, etc. are optionally present. For example, a system "comprising" components A, B, and C can contain only components A, B, and C, or can contain not only components A, B, and C, but also one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

In one aspect, an organic herbicide and a method of using the organic herbicide to control the growth of unwanted plants are provided. In a preferred embodiment, the organic herbicide comprises sodium lauryl sulfate (SLS), citric acid, malic acid, sodium chloride (NaCl), water, and an antifoaming agent, which is preferably castor oil. All of the ingredients of the herbicide are preferably ingredients that are exempted under Section 25(b) of FIFRA. The SLS is preferably sourced from palm oil rather than from petroleum, which may make the SLS more stable in the formulation, as well as environmentally sustainable. In one preferred embodiment, the organic herbicide may consist essentially of sodium lauryl sulfate, citric acid, malic acid, sodium chloride, castor oil, and water and not include a substantial quantity of any other ingredients. In particular, the herbicide preferably does not include non-organic or synthetic ingredients, and more particularly does not include any ingredients not exempted under Section 25(b) of FIFRA. In addition, the herbicide preferably does not include acetic acid, though this compound is also exempted as an inert ingredient under Section 25(b). Acetic acid is highly corrosive to spray equipment and harmful to human health at the concentrations utilized in herbicides, which is typically in the range of 20-30% acetic acid by weight. The herbicide also does not include glyphosate or glufosinate.

In alternative embodiments, the organic herbicide may include other organic ingredients. For instance, the herbicide may optionally include one or more other types of alpha-hydroxy acids (AHA) in place of or in addition to the alpha-hydroxy acids citric acid and malic acid. Such AHAs may include, but are not limited to, glycolic acid, lactic acid, and mandelic acid. In another alternative embodiment, the herbicide may optionally include sodium lauryl ether sulfate (SLES), commonly referred to as sodium laureth sulfate, in place of or in combination with sodium lauryl sulfate, which is sometimes referred to as sodium dodecyl sulfate (SDS). Both SLS and SLES are surfactants commonly used in soaps, shampoos, toothpaste, and skincare products. In other alternative embodiments, other surfactant agents such as ammonium lauryl sulfate (ALS) may optionally be utilized in place of or in combination with SLS and/or SLES. In addition, in other alternative embodiments, other salts suitable for systemically killing weeds may optionally be utilized in place of or in combination with sodium chloride. Further, other antifoaming agents, which are preferably also exempted under Section 25(b), may be utilized in place of or in combination with castor oil.

The organic herbicide preferably comprises about 2% to 15% sodium lauryl sulfate by weight, about 2% to 15% citric acid by weight, about 2% to 15% malic acid by weight, about 2% to 15% sodium chloride by weight, about 0.3% to 5% castor oil by weight, and at least 50% water by weight, and more preferably comprises about 3% to 10% sodium lauryl sulfate by weight, about 3% to 8% citric acid by weight, about 3% to 8% malic acid by weight, about 3% to 8% sodium chloride by weight, about 0.3% to 1% castor oil by weight, and at least 65% water by weight. In one preferred embodiment, the organic herbicide comprises approximately 7.5% sodium lauryl sulfate by weight, approximately 6% citric acid by weight, approximately 6% malic acid by weight, approximately 5.5% sodium chloride by weight, approximately 0.5% castor oil by weight, and approximately 74.5% water by weight.

In a preferred embodiment, a concentrated formula of the organic herbicide may be produced for shipping purposes and then diluted with water by an end user before application to plants. In a preferred embodiment, the concentrated formula comprises about 10% to 25% sodium lauryl sulfate by weight, about 5% to 20% citric acid by weight, about 5% to 20% malic acid by weight, about 3% to 20% sodium chloride by weight, about 2% to 5% castor oil by weight, and about 10% to 20% water by weight. In one preferred embodiment, the concentrated formula comprises approximately 24.5% sodium lauryl sulfate by weight, approximately 20% citric acid by weight, approximately 20% malic acid by weight, approximately 18% sodium chloride by weight, approximately 2% castor oil by weight, and approximately 15.5% water by weight. This concentrated formula minimizes the concentrations of liquid components in order to minimize the overall volume of the product that has to be shipped to end users.

FIG. 1 shows an illustrative method for producing a concentrated liquid, aqueous-based formulation of the present organic herbicide. It should be understood by one skilled in the art that the production method shown in FIG. 1 may be varied and still fall within the scope of the present disclosure. For example, the order of certain operations may be varied or the operating conditions may be varied and still fall within the scope of the present disclosure. This method may also be used for producing a ready-to-use liquid formulation that is not concentrated by increasing the amount of water used in the formulation or adding additional water to the concentrated composition.

The production method begins with providing the various raw ingredients, which, in a preferred embodiment, comprise sodium lauryl sulfate, citric acid, malic acid, sodium chloride, castor oil, and water. The SLS, citric acid, malic acid, and sodium chloride raw ingredients are generally available commercially as solid compounds that are soluble in water. The citric acid and malic acid are both typically available in powder form. The SLS is typically a white or cream-colored solid, and the sodium chloride is preferably in the form of fine-graded crystals. In the exemplary method shown in FIG. 1, multiple mixing tanks and a separate blend tank are utilized for producing the concentrated liquid formulation. In test batches, two 250 gallon mixing tanks and one 1,500 gallon blend tank was utilized, though tanks of varying sizes may be utilized depending on the quantity to be produced. The production system may be performed manually or may be automated to enhance production efficiency.

First, the powdered citric acid and malic acid components are each diluted with water to a desired concentration, preferably in separate mixing tanks. The citric acid and malic acid are both preferably diluted in water at a temperature of about 140 degrees to about 150 degrees Fahrenheit, which may help both acids to dissolve into solution more effectively. A mixer such as a paddle mixer may be used to aid in mixing and dissolving the acids into solution. In a preferred embodiment, each of the citric acid and the malic acid are diluted in water into a 70% acid solution by weight in separate mixing tanks. Each tank may then be transferred into a blending tank. The blended acid solution is preferably mixed in the blend tank for approximately one hour before adding additional ingredients.

Next, the sodium lauryl sulfate may be added into the blended acid solution in the blend tank. The sodium lauryl sulfate is a solid compound that may be added into the liquid acid blend by weight to achieve a desired concentration of SLS. The sodium chloride may be diluted in water prior to addition into the blend tank. The sodium chloride may preferably be diluted in water before being transferred into the blend tank. Next, castor oil may be added into the blend tank by weight to achieve a desired concentration of castor oil. The aqueous solution including SLS, citric acid, malic acid, sodium chloride, and castor oil is preferably then mixed and blended for at least 30 minutes, at which point the final concentrated liquid herbicide product is a homogenous liquid composition that may then be transferred into containers with labels for shipment.

In one preferred embodiment, the amount of each of the ingredients used in accordance with the above-described production method is adjusted by weight to produce a concentrated liquid organic herbicide having the following composition: approximately 24.5% sodium lauryl sulfate by weight, approximately 20% citric acid by weight, approximately 20% malic acid by weight, approximately 18% sodium chloride by weight, approximately 2% castor oil by weight, and approximately 15.5% water by weight. However, it should be understood that these concentrations may be adjusted within certain ranges and still fall within the scope of the present disclosure. This concentrated formula may then be shipped to an end user for dilution with water to the final, ready-to-use concentration. This concentrated formula allows the end user to simply add water to the concentration with minimal mixing to produce a homogenous liquid product suitable for direct application to plants. In one preferred embodiment, the ready-to-use composition of the liquid organic herbicide after dilution with water may have the following composition: approximately 7.5% sodium lauryl sulfate by weight, approximately 6% citric acid by weight, approximately 6% malic acid by weight, approximately 5.5% sodium chloride by weight, approximately 0.5% castor oil by weight, and approximately 74.5% water by weight. In a preferred embodiment, the ready-to-use formulation may be applied uniformly to a plot of land at a rate of at least 20 gallons per acre for burndown of all weeds and unwanted plants on the plot.

The present organic herbicide is a liquid formulation that may be used to eliminate weeds or any other unwanted plants. Once the individual ingredients are blended into a homogenous liquid, the herbicide may be applied directly onto the foliage of any weeds to be killed. The liquid herbicide may then be allowed to remain on the foliage of the weeds for a period of time sufficient to kill the weeds. The herbicide is generally a fast-acting herbicide but also continues to act over a period of time to provide a more complete kill. The herbicide is non-selective and thus will kill any plant onto which the herbicide is directly applied to the plant's foliage. However, the herbicide is biodegradable and does not cause any soil contamination and thus kills only plants to which it is directly applied. After direct application of the herbicide onto foliage, initial effects may be visibly observed typically within hours of application.

Applicant has found that the combination of ingredients results in an organic herbicide that may provide a complete kill of weeds onto which the herbicide is directly applied.

Although initial results may be visibly observed within a relatively short period of time, the present organic herbicide may also provide a staggered, time-released kill of weeds that results in a prolonged and more complete kill. In addition, Applicant has found that the combination of ingredients results in an organic herbicide that may kill weeds systemically, which may significantly delay reemergence of weeds, thus making the present herbicide more effective. To systemically kill weeds onto which the herbicide is applied, the herbicide may move within the vascular system of weeds and move down to the roots of the weed, thereby eventually killing the weed at its roots after initial application to the foliage of the weed.

It is hypothesized that the particular combination of some of the individual ingredients in the present herbicide may act synergistically and thus result in a more effective organic herbicide due to specific functions of each individual ingredient and interactions between ingredients. Water is utilized in the composition to dissolve all solid compounds and to dilute the product to effective concentrations of active ingredients while also minimizing the concentrations of active ingredients that are able to achieve a desired efficacy. The castor oil or other antifoaming agent prevents the formulation from foaming during shipment and use. The remaining ingredients each may have a more direct function in terms of killing the weeds to which the herbicide is applied. For instance, the sodium lauryl sulfate may act to strip wax from weed foliage, which then allows other ingredients of the herbicide composition to more effectively penetrate the leaf to kill the plant. The citric acid, malic acid, and sodium chloride may then penetrate the plant to kill the plant by differing mechanisms. Without being bound by theory, it is believed that the combination of citric acid and malic acid works effectively because the citric acid acts to kill the plant relatively quickly, and the malic acid acts to kill the plant relatively slowly over a more prolonged period of time. The citric acid may penetrate the leaf and inhibit cell growth by targeting the enzymes for fat formation, thereby halting cell development of the plant. The malic acid performs a similar function as the citric acid; however, the malic acid may penetrate the leaf more slowly than the citric acid, which may reinforce the action of the citric acid over a period of time, thereby prolonging the killing effect of the citric acid and thus resulting in a more complete kill. Without being bound by theory, Applicant further believes that the sodium chloride component acts to provide a more complete kill by moving through the vascular system of the plant down to the plant roots. Accordingly, the combination of ingredients in the present organic herbicide may act synergistically to kill weeds effectively and systemically.

The present organic herbicide may be used in a variety of applications. In agricultural applications, the herbicide may be used to burn off fields of unwanted weeds both before and after planting to grow more robust crops. Because the present herbicide is biodegradable and thus does not contaminate soils, an extended wait time is not necessary before replanting crops. In contrast, other known herbicides often require a wait time of weeks before replanting crops after the application of the herbicide to a field. In forestry applications, the herbicide may be used for minimizing brush and thinning out weeds to help prevent forest fires. The herbicide may also be utilized in a variety of other commercial and residential applications, such as residential lawn and garden applications and at schools, parks, highways, railroads, or other similar applications in which an environmentally friendly and non-toxic herbicide is required for non-selective weed clearing. The present herbicide is safe to human health, including users directly handling the herbicide, as well as wildlife and the environment.

To illustrate the efficacy of the present herbicide, trials were performed with hemp and with uncultivated brush.

Hemp Trials

The hemp trials were performed by a third party for the primary purpose of analyzing the potency of hemp samples, primarily the cannabidiol (CBD) and tetrahydrocannabinol (THC) content of the hemp, after application of herbicides to plots on which the hemp was grown. The present herbicide was prepared as a concentration, which was then mixed with water at 4 fluid ounces of herbicide concentrate to one gallon of water. The concentrations of the herbicide as applied was as follows: approximately 4.5% sodium lauryl sulfate by weight, approximately 3.5% citric acid by weight, approximately 3.5% malic acid by weight, approximately 3.1% sodium chloride by weight, approximately 0.4% castor oil by weight, and approximately 85% water by weight. The present herbicide was then compared to an untreated control and four commonly available commercial herbicides that are approved for use on hemp in the state of Alabama where the trial was conducted. The field in which the hemp was planted was first prepared with a burndown herbicide and plastic was laid on a weed-free bed immediately prior to transplanting the hemp. Six-week-old hemp seedlings were then hand transplanted into the field. No weed control was done for three weeks. All plots were one row wide and 10 plants long (approximately 25 feet). Sprays of herbicide were initiated three weeks after transplanted in a randomized replicated complete block with four replications. Four sprays were applied to weeds present on the hemp plots at two-week or three-week intervals based on environmental conditions. The herbicides were all applied using a backpack sprayer and the highest labeled rate of each herbicide based on the size of the weeds. Weed coverage was assessed on a weekly basis with two measurements. The percent weed coverage of each plot was assessed as well as the percent weed coverage in a one square foot quadrat. Weed species were recorded for each plot. The most common weeds present on the hemp plots were morning glory, carpetweed, sicklepod, and horsenettle. Data was collected for eight weeks until shortly before harvest.

At the end of the trial, all treatments had significantly less percentage of weed coverage than the untreated control. In addition, at the end of the trial, all herbicide treatments, including the present herbicide, were found to be not significantly different from each other, but all had significantly less weed coverage than the untreated control. Thus, the hemp trial illustrated that the present herbicide exhibited similar effectiveness compared to other commercially available herbicides that are not generally considered to be environmentally friendly and non-toxic. In addition, it was found that there were no statistically significant differences in CBD or THC content across treatments, including with the present herbicide.

Uncultivated Brush Trials

Trials were performed on uncultivated heavy brush in the state of South Carolina. The objective of the trials was to evaluate the burndown efficacy of the present herbicide at various concentration rates and carrier volumes. The vegetative burndown efficacy trials were conducted on an uncultivated, seasonally mowed, heavy brush field at Hut Plantation located on Johns Island, S.C., in the early fall of 2021. The field contained a fairly homogenous loamy sand (fine sand, thermic, coated Typic Quartzipsamments). Vegetation present represented a wide range of common grasses and scrubs indigenous to the area, which was last mowed in the late spring of 2021, and averaged approximately 1.22 to 1.52 meters (approximately 4 to 5 feet) in height.

Chemical treatments of the present herbicide were individually mixed at concentrations of 31.25 milliliters per liter (4 ounces of concentrated herbicide per gallon of water), 46.88 milliliters per liter (6 ounces of concentrated herbicide per gallon of water), and 62.51 milliliters per liter (8 ounces of concentrated herbicide per gallon of water), and then applied to thick brush at a volumetric rate of 200 liters per hectare (21.38 gallons per acre) and/or 400 liters per hectare (42.76 gallons per acre) as shown in Table 1 below. For each treatment, the concentrated formula comprised approximately 24.5% sodium lauryl sulfate by weight, approximately 20% citric acid by weight, approximately 20% malic acid by weight, approximately 18% sodium chloride by weight, approximately 2% castor oil by weight, and approximately 15.5% water by weight. Based on these concentrations, the 8 ounces per gallon formulation had a final concentration of herbicide applied to the brush as follows: approximately 7.5% sodium lauryl sulfate by weight, approximately 6% citric acid by weight, approximately 6% malic acid by weight, approximately 5.5% sodium chloride by weight, approximately 0.5% castor oil by weight, and approximately 74.5% water by weight. Further, the 4 ounces per gallon formulation had a final concentration of herbicide applied to the brush as follows: approximately 4.5% sodium lauryl sulfate by weight, approximately 3.5% citric acid by weight, approximately 3.5% malic acid by weight, approximately 3.1% sodium chloride by weight, approximately 0.4% castor oil by weight, and approximately 85% water by weight.

A backpack sprayer was utilized for applying the herbicide. The brush was monitored over a 14-day period, and compared to an untreated control.

Treatment plots were arranged in a randomized complete block design as shown in Table 2, which measured 9.14 meters by 1.83 meters (30 feet by 6 feet), and spaced 2.13 meters (7 feet) apart. Treatments were replicated four times. Herbicide vegetative burndown rates as a percentage for each individual plot were recorded on days 4, 7, and 14 following treatment application. Collected data was used to determine the efficacy of herbicide vegetative burndown and is reported as a least square means. The pH of the local well water sourced for these trials, the concentrated formulation of the present herbicide, and the final tank mixes were measured and are shown in Table 3. In the tables below, formulations of varying concentrations of the present herbicide are generally referred to as "Lonarch" herbicides or treatments.

TABLE 1

Application rates of Lonarch herbicide treatments for herbicide vegetative burndown efficacy rate study during 2021 growing season at Hut Plantation, Johns Island, SC.
Application Rates of Sodium Lauryl Sulfate (Lonarch)

| Treatment | Concentration | Carrier Volume | Application Rate |
|---|---|---|---|
| 1 | Control | — | — |
| 2 | 4 oz/gal | 21.38 gal/ac | 85.48 oz/ac |
| 3 | 4 oz/gal | 42.76 gal/ac | 170.96 oz/ac |
| 4 | 6 oz/gal | 21.38 gal/ac | 128.22 oz/ac |
| 5 | 8 oz/gal | 21.38 gal/ac | 170.96 oz/ac |

Water carrier volumes of 21.38 & 42.76 gallons per acre equivalent to 200 & 400 liters per hectare, respectively

TABLE 2

Uncultivated, heavy brush field plot plan of Lonarch treatments for herbicide vegetative burndown efficacy rate study during 2021 growing season at Hut Plantation, Johns Island, SC.
Plot Plan

| Rep | Plot 1 | Plot 2 | Plot 3 | Plot 4 | Plot 5 |
|---|---|---|---|---|---|
| 1 | 4 oz/gal[a] 21.38 gal/ac[b] | 4 oz/gal 42.76 gal/ac | Control[c] | 6 oz/gal 21.38 gal/ac | 8 oz/gal 21.38 gal/ac |
| Rep | Plot 6 | Plot 7 | Plot 8 | Plot 9 | Plot 10 |
| 2 | 4 oz/gal 42.76 gal/ac | 4 oz/gal 21.38 gal/ac | Control | 8 oz/gal 21.38 gal/ac | 6 oz/gal 21.38 gal/ac |
| Rep | Plot 11 | Plot 12 | Plot 13 | Plot 14 | Plot 15 |
| 3 | 6 oz/gal 21.38 gal/ac | Control | 4 oz/gal 21.38 gal/ac | 4 oz/gal 42.76 gal/ac | 8 oz/gal 21.38 gal/ac |
| Rep | Plot 16 | Plot 17 | Plot 18 | Plot 19 | Plot 20 |
| 4 | Control | 8 oz/gal 21.38 gal/ac | 6 oz/gal 21.38 gal/ac | 4 oz/gal 21.38 gal/ac | 4 oz/gal 42.76 gal/ac |

[a]Sodium Lauryl Sulfate (Lonarch) Concentration Rate
[b]Water Carrier Volume
[c]Untreated Control

TABLE 3 pH measurements of liquids used for Lonarch herbicide vegetative burndown efficacy rate study during 2021 growing season at Hut Plantation, Johns Island, SC.
pH Measurements of Liquid Components and Tank Mixtures

| Component/Mixture | pH |
|---|---|
| Local Well Water | 8.00 |
| Lonarch Concentrate | 1.00 |
| 4 ounces per gallon[a] | 2.48 |
| 6 ounces per gallon | 2.32 |
| 8 ounces per gallon | 2.28 |

[a]Sodium Lauryl Sulfate (Lonarch) Concentration Rate Tank Mixed in Local Well Water Untreated Control plots showed no adverse change over the course of this study, had average vegetative burndown measurements of 0.00% for days 4, 7, and 14 after application (See Table 4 below), and served as the baseline for determining significant difference with respect to burndown efficacy for the tested herbicide treatments. Average vegetative burndown for the present herbicide mixed at 4 oz/gal and applied at 21.38 gal/ac was 31.25%, 37.50%, and 25.00% for days 4, 7, and 14 after application of the herbicide, respectively. The average percent vegetative burndown for this treatment was significantly different from the Untreated Control average on days 4, 7, and 14 after application. Average vegetative burndown for the present herbicide mixed at 4 oz/gal and applied at 42.76 gal/ac was 56.25%, 60.00%, and 48.75% for days 4, 7, and 14 after application, respectively. The average percent vegetative burndown for this treatment was significantly different from the Untreated Control average on days 4, 7, and 14 after application. Average vegetative burndown for the present herbicide mixed at 6 oz/gal and applied at 21.38 gal/ac was 51.25%, 55.00%, and 40.00% for days 4, 7, and 14 after application, respectively. The average percent vegetative burndown for this treatment was significantly different from the Untreated Control average on days 4, 7, and 14 after application. Average vegetative burndown for the present herbicide mixed at 8 oz/gal and applied at 21.38 gal/ac was 48.75%, 53.75%, and 38.75% for days 4, 7, and 14 after application, respectively. The average percent vegetative burndown for this treatment was significantly different from the Untreated Control average on days 4, 7, and 14 after application.

Figure 2:
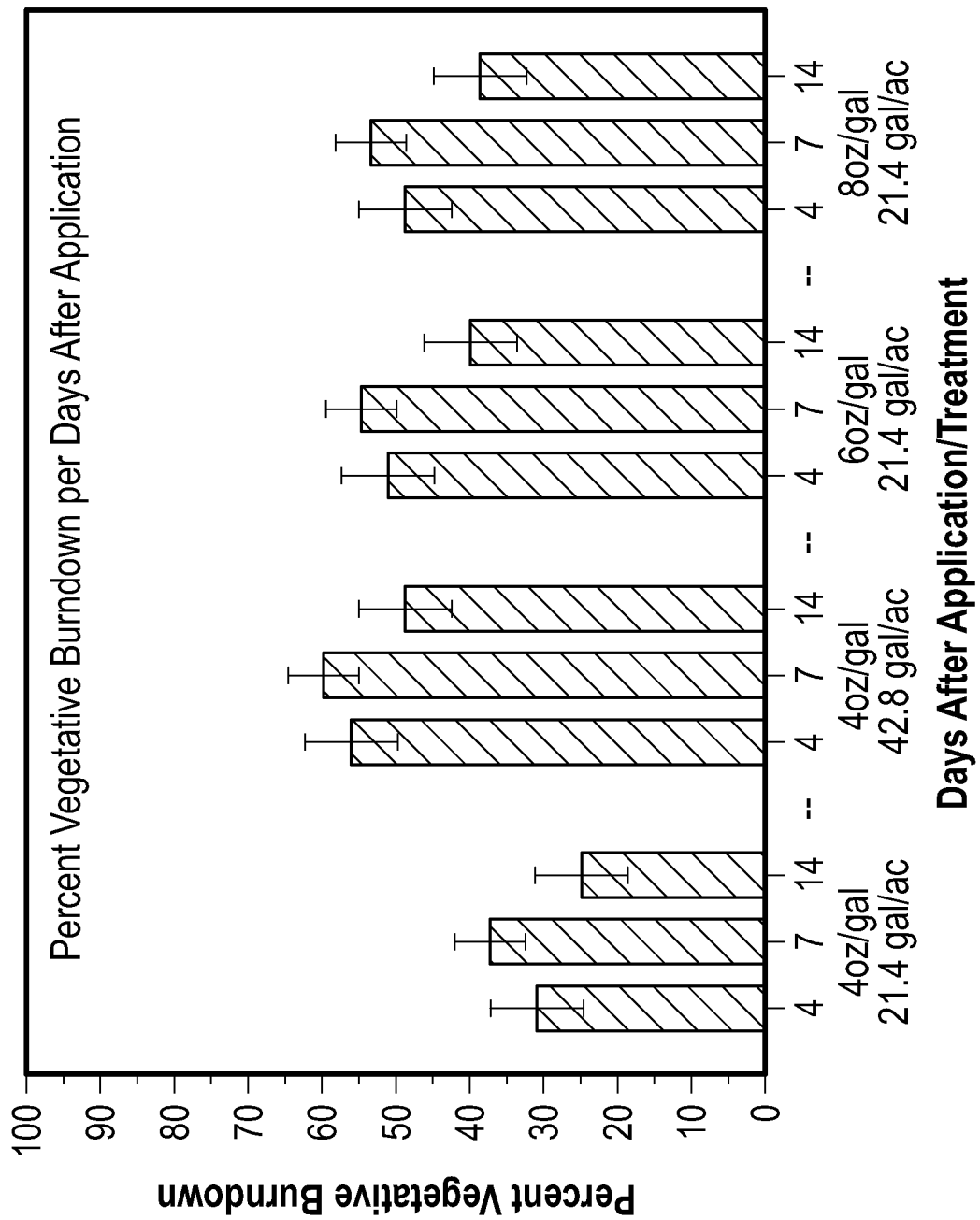
FIG. 2 shows a chart indicating the vegetative burndown of weeds after application of the present herbicide at varying concentrations and application rates.

The present herbicide mixed at 4 oz/gal and applied at 42.76 gal/ac showed the greatest percent vegetative burndown average of all treatments 4 days after application and was significantly different from the present herbicide mixed at 4 oz/gal and applied at 21.38 gal/ac but not significantly different from the present herbicide mixed at 6 oz/gal or 8 oz/gal and applied at 21.38 gal/ac, as shown in FIG. 2. The present herbicide mixed at 6 oz/gal and applied at 21.38 gal/ac showed the second greatest percent vegetative burndown average of the treatments 4 days after application, was significantly different than the present herbicide mixed at 4 oz/gal and applied at 21.38 gal/ac, and was not significantly different from the present herbicide mixed at 8 oz/gal and applied at 21.38 gal/ac. The present herbicide mixed at 8 oz/gal and applied at 21.38 gal/ac showed the third greatest percent vegetative burndown average of the treatments 4 days after application but was not significantly different from the present herbicide mixed at 4 oz/gal and applied at 21.38 gal/ac.

The present herbicide mixed at 4 oz/gal and applied at 42.76 gal/ac showed the greatest percent vegetative burndown average of all treatments 7 days after application and was significantly different from the present herbicide mixed at 4 oz/gal and applied at 21.38 gal/ac but not significantly different from the present herbicide mixed at 6 oz/gal or 8 oz/gal and applied at 21.38 gal/ac. The present herbicide mixed at 6 oz/gal and applied at 21.38 gal/ac showed the second greatest percent vegetative burndown average of the treatments 7 days after application, was significantly different than the present herbicide mixed at 4 oz/gal and applied at 21.38 gal/ac, and was not significantly different from the present herbicide mixed at 8 oz/gal and applied at 21.38 gal/ac. The present herbicide mixed at 8 oz/gal and applied at 21.38 gal/ac showed the third greatest percent vegetative burndown average of the treatments 7 days after application and was significantly different from the present herbicide mixed at 4 oz/gal and applied at 21.38 gal/ac.

The present herbicide mixed at 4 oz/gal and applied at 42.76 gal/ac showed the greatest percent vegetative burndown average of all treatments 14 days after application and was significantly different from the present herbicide mixed at 4 oz/gal and applied at 21.38 gal/ac but not significantly different from the present herbicide mixed at 6 oz/gal or 8 oz/gal and applied at 21.38 gal/ac. The present herbicide mixed at 6 oz/gal and applied at 21.38 gal/ac showed the second greatest percent vegetative burndown average of the treatments 14 days after application but was not significantly different from the present herbicide mixed at 4 or 8 oz/gal and applied at 21.38 gal/ac. The present herbicide mixed at 8 oz/gal and applied at 21.38 gal/ac showed the third greatest percent vegetative burndown average of the treatments 14 days after application but was not significantly different from the present herbicide mixed at 4 oz/gal and applied at 21.38 gal/ac.

TABLE 4

Lonarch herbicide vegetative burndown percentage measured 4, 7, and 14 days after application for uncultivated, heavy brush herbicide burndown efficacy rate study during 2021 growing season at Hut Plantation, Johns Island, SC.

| Treatment | Day 4 | Day 7 | Day 14 |
| --- | --- | --- | --- |
| Untreated Control | 0.00% c[a] | 0.00% c | 0.00% c |
| 4 oz/gal at 21.38 gal/ac | 31.25% b | 37.50% b | 25.00% b |
| 4 oz/gal at 42.76 gal/ac | 56.25% a | 60.00% a | 47.75% a |

TABLE 4-continued

Lonarch herbicide vegetative burndown percentage measured 4, 7, and 14 days after application for uncultivated, heavy brush herbicide burndown efficacy rate study during 2021 growing season at Hut Plantation, Johns Island, SC.

| Treatment | Day 4 | Day 7 | Day 14 |
| --- | --- | --- | --- |
| 6 oz/gal at 21.38 gal/ac | 51.25% a | 55.00% a | 40.00% ab |
| 8 oz/gal at 21.38 gal/ac | 48.75% ab | 53.75% a | 38.75% ab |

[a]Means in columns with common letter are not significantly different (P > 0.05; T-test).

Results of Brush Trials

Untreated Control plots showed no adverse symptoms of environmental or chemical pressures during the course of this study and were suitable in determining a baseline for herbicide burndown efficacy for all other treatments. Growing conditions before and during the study were considered favorable. Vegetative species found across the control treatment plots represented a broad range of grasses and scrubs indigenous or common to the testing region. Species found in the control treatment plots were overall uniformly represented throughout all treatment plots in the field.

The present herbicide mixed at 4 oz/gal and applied at 21.38 gal/ac showed initially rapid and significant evidence of vegetative burndown although ultimately not thorough vegetative burndown in this test setting. This chemical application rate and/or water carrier volume again did not seem sufficient to achieve a thorough level of vegetative burndown under these test parameters in which the herbicide was applied to very thick brush rather than light brush or individual weeds. Given that the present herbicide is a contact herbicide, it is likely the canopy density of the treated heavy brush in conjunction with the relatively low water carrier volume used decreased the anticipated overall vegetative burndown rate for this treatment due to inadequate chemical contact with vegetative surfaces as observed. It was previously postulated that increasing the water carrier volume would increase the vegetative burndown in this setting on uncultivated, heavy brush, which was in fact observed in this study.

Both doubling the water carrier volume rate from 21.38 gal/ac to 42.76 gal/ac with the chemical concentration rate or increasing the chemical concentration rate by a factor of 50 or 100% at an application rate of 21.38 gal/ac resulted in a significant increase in vegetative burndown in this study. The application rate of 21.38 gal/ac at the concentration rate of 4 oz/gal, while causing significant vegetative burndown relative to untreated controls, apparently did not adequately penetrate the dense canopy and thoroughly cover the foliage in this heavy brush setting as indicated by the relatively low vegetative burndown rates observed in this study. The increased application rate of 42.76 gal/ac did appear to adequately penetrate the dense canopy and thoroughly cover the foliage in this heavy brush setting as indicted by the relatively high vegetative burndown rates observed in this study and confirms that the present contact herbicide should be applied in a manner to thoroughly wet the foliage.

The final solution pH of the present herbicide, when mixed to the of 4 oz/gal, was observed to be around 2.5 in this study and was likely impacted by the slightly basic nature of the well water sourced from the trial location. Increasing the present herbicide concentration rate did slightly decrease the final solution pH and this slight increase in acidity may have compensated up to a point for a lack of thorough coverage due to a potentially inadequate water carrier volume when applied at 21.38 gal/ac in this setting. While the liquid component and tank mixture measurements of pH were recorded, this study did not assess vegetative burndown as a function of pH.

These observed higher vegetative burndown rates with increases in the present herbicide concentration or water carrier volume were in the same range of observations made in a previous study at this location with glyphosate and glufosinate. While these studies were separated by approximately three months during the active growing period for warm season grasses and the first study contained only one treatment level with the present herbicide, vegetative burndown rates with the present herbicide observed across both studies were similar at the concentration rate of 4 oz/gal when applied at 21.38 gal/ac. The earlier onset of greater vegetative burndown was also observed for all treatments of the present herbicide in both studies relative to that observed for glyphosate and glufosinate in the previous study.

The results of this study indicate that present herbicide is an effective vegetative burndown herbicide. Utilizing a higher concentration rate or greater water carrier volume in applications on uncultivated, heavy brush had a significant effect of increasing the vegetative burndown efficacy and produced relatively similar levels of vegetative burndown observed with glyphosate and glufosinate in previous work of a similar nature at this test location. The ingredients found in the present herbicide are another useful means in land management where weed control via burndown herbicide application is selected. User application rates should to be varied within a commonly prescribed range based on the height and density of the vegetation on which the product is being applied, with taller and denser vegetation calling for greater carrier volume application, as is typically the case with herbicide application recommendations.

It is understood that versions of the present disclosure may come in different forms and embodiments. Additionally, it is understood that one of skill in the art would appreciate these various forms and embodiments as falling within the scope of the invention as disclosed herein.

What is claimed is:

1. An herbicide composition, comprising:
   2% to 15% sodium lauryl sulfate by weight;
   2% to 15% citric acid by weight;
   2% to 15% malic acid by weight;
   2% to 15% sodium chloride by weight;
   0.3% to 5% of an antifoaming agent by weight; and
   at least 50% water by weight.

2. The herbicide composition of claim 1, wherein the antifoaming agent is castor oil.

3. The herbicide composition of claim 2, wherein the herbicide composition comprises:
   3% to 10% sodium lauryl sulfate by weight;
   3% to 8% citric acid by weight;
   3% to 8% malic acid by weight;
   3% to 8% sodium chloride by weight;
   0.3% to 1% castor oil by weight; and
   at least 65% water by weight.

4. The herbicide composition of claim 2, wherein the herbicide composition comprises:
   approximately 7.5% sodium lauryl sulfate by weight;
   approximately 6% citric acid by weight;
   approximately 6% malic acid by weight;
   approximately 5.5% sodium chloride by weight;
   approximately 0.5% castor oil by weight by weight; and
   approximately 74.5% water by weight.

5. The herbicide composition of claim 1, further comprising at least one of glycolic acid, lactic acid, and mandelic acid.

6. The herbicide composition of claim 1, further comprising sodium laureth sulfate.

7. The herbicide composition of claim 1, wherein the herbicide composition does not include glyphosate or glufosinate.

8. The herbicide composition of claim 1, wherein the herbicide composition does not include acetic acid.

9. The herbicide composition of claim 1, wherein the sodium lauryl sulfate is sourced from palm oil.

10. A method of using an herbicide composition to eliminate weeds, wherein the method comprises steps of:
    providing the herbicide composition, wherein the herbicide composition comprises:
    2% to 15% sodium lauryl sulfate by weight,
    2% to 15% citric acid by weight,
    2% to 15% malic acid by weight,
    2% to 15% sodium chloride by weight,
    0.3% to 5% of an antifoaming agent by weight,
    and at least 50% water by weight; applying the herbicide composition directly onto foliage of weeds to be killed; and allowing the herbicide composition to remain on the foliage of the weeds for a period of time sufficient to kill the weeds.

11. The method of claim 10, wherein applying the herbicide composition comprises applying the herbicide composition uniformly to a plot of land at a rate of at least 20 gallons per acre.

12. The method of claim 10, wherein the antifoaming agent is castor oil.

13. The method of claim 12, wherein the herbicide composition comprises:
    3% to 10% sodium lauryl sulfate by weight;
    3% to 8% citric acid by weight;
    3% to 8% malic acid by weight;
    3% to 8% sodium chloride by weight;
    0.3% to 1% castor oil by weight; and
    at least 65% water by weight.

14. The method of claim 12, wherein the herbicide composition comprises:
    approximately 7.5% sodium lauryl sulfate by weight;
    approximately 6% citric acid by weight;
    approximately 6% malic acid by weight;
    approximately 5.5% sodium chloride by weight;
    approximately 0.5% castor oil by weight by weight; and
    approximately 74.5% water by weight.

15. The method of claim 10, wherein the herbicide composition does not include glyphosate or glufosinate.

16. The method of claim 10, wherein the herbicide composition does not include acetic acid.

17. A concentrated herbicide composition, comprising:
    10% to 25% sodium lauryl sulfate by weight;
    5% to 20% citric acid by weight;
    5% to 20% malic acid by weight;
    3% to 20% sodium chloride by weight;
    2% to 5% of an antifoaming agent by weight; and
    10% to 20% water by weight.

18. The concentrated herbicide composition of claim 17, wherein the antifoaming agent is castor oil.

19. The concentrated herbicide composition of claim 18, wherein the concentrated herbicide composition comprises:
    approximately 24.5% sodium lauryl sulfate by weight;
    approximately 20% citric acid by weight;
    approximately 20% malic acid by weight;
    approximately 18% sodium chloride by weight;
    approximately 2% castor oil by weight by weight; and
    approximately 15.5% water by weight.

20. The concentrated herbicide composition of claim 17, wherein the concentrated herbicide composition does not include acetic acid.

* * * * *